(12) United States Patent
Aybay et al.

(10) Patent No.: US 8,284,665 B1
(45) Date of Patent: Oct. 9, 2012

(54) FLOW-BASED RATE LIMITING

(75) Inventors: Gunes Aybay, Los Altos, CA (US); Jack Kohn, Mountain View, CA (US); Fuguang Shi, Saratoga, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 511 days.

(21) Appl. No.: 12/020,927

(22) Filed: Jan. 28, 2008

(51) Int. Cl.
*G06F 11/00* (2006.01)
(52) U.S. Cl. ........................................................ 370/235
(58) Field of Classification Search ........... 370/230–235
See application file for complete search history.

(56) References Cited

U.S. PATENT DOCUMENTS

| | | | |
|---|---|---|---|
| 5,666,353 A * | 9/1997 | Klausmeier et al. .......... 370/230 |
| 6,643,260 B1 * | 11/2003 | Kloth et al. .................... 370/235 |
| 7,047,536 B1 * | 5/2006 | Duncan et al. ................. 719/330 |
| 2003/0097460 A1 * | 5/2003 | Higashiyama et al. ........ 709/232 |
| 2004/0062200 A1 * | 4/2004 | Kesavan ......................... 370/235 |
| 2005/0222815 A1 * | 10/2005 | Tolly .............................. 702/185 |
| 2005/0249214 A1 * | 11/2005 | Peng .............................. 370/392 |
| 2006/0262734 A1 * | 11/2006 | Appanna et al. .............. 370/254 |
| 2008/0002586 A1 * | 1/2008 | Sahita et al. ................... 370/235 |

* cited by examiner

*Primary Examiner* — Anh-Vu Ly
*Assistant Examiner* — Mang Yeung
(74) *Attorney, Agent, or Firm* — Harrity & Harrity, LLP

(57) ABSTRACT

A device may include logic configured to receive a packet, identify a flow associated with the packet in a flow table, and identify a rate limit associated with the flow in the flow table. A current rate associated with the flow may be calculated based on the packet. It may be determined whether the current rate associated with the flow exceeds the rate limit associated with the flow. If so, the packet may be discarded or tagged as "over limit."

19 Claims, 6 Drawing Sheets

FLOW-BASED RATE LIMITING

BACKGROUND OF THE INVENTION

In an increasingly networked world, more and more traffic, such as data, voice, and video, is transmitted over public and proprietary networks. When routing traffic through the network, it may be desirable to be able to assign different bandwidth limits to different types of traffic created and/or consumed by each user as the traffic traverses the network. In cases where the uplink bandwidth is shared by a large number of users, such as DSL or Cable Modem termination systems, it is important for a service provider to guarantee a degree of fairness in terms of how the uplink bandwidth is consumed by individual users. It may also be necessary to differentiate the amount of bandwidth allocated for different classes of users and/or applications. For example, some users may pay a premium rate for higher bandwidth or lower latency access to the network. Some applications may require stringent limits on end-to-end traffic delay while other applications may require minimal bandwidth guarantees. For example, because streaming video and voice data, when it is delayed, can result in a noticeable degradation in quality to the end-user, it may be desirable to ensure that this type of type of traffic receives a larger share of the available bandwidth by limiting other types of traffic. Thus, service providers may find it necessary to be able to assign individual rate limits for large number of network traffic flows, where each flow is associated with a particular user class and/or a particular application.

In Internet Protocol (IP) packet-based networks, each packet may include a header section, a portion of which may be used to indicate the source, destination, traffic class and application identifiers associated with the packet that define the "flow" to which the packet is assigned. A router at the edge of a network may set the flow for a packet. Routers in the core of the network may identify a flow to which traffic belongs and handle the flow accordingly.

SUMMARY

In one aspect, a method may include receiving a packet; identifying a flow associated with the packet; identifying a rate limit associated with the flow; calculating a current rate associated with the flow based on the packet; and determining whether the current rate associated with the flow exceeds the rate limit associated with the flow.

In another aspect, a network device may include forwarding logic to receive a data unit, and flow logic. The forwarding logic may be configured to identify a class associated with the data unit; identify a rate limit associated with the data unit based on the identified class; and forward the data unit and the identified rate limit to the flow logic. The flow logic may be configured to identify a flow associated with the data unit; associate the rate limit with the flow; calculate a current rate associated with the flow based on the data unit and the rate limit; and determine whether the current rate associated with the flow exceeds the rate limit.

In yet another aspect, a network device may include means for receiving a packet; means for identifying a flow associated with the packet in a flow table; means for identifying a rate limit associated with the flow in the flow table; means for calculating a current rate associated with the flow based on the packet; and means for determining whether the current rate associated with the flow exceeds the rate limit associated with the flow.

BRIEF DESCRIPTION OF THE DRAWINGS

The accompanying drawings, which are incorporated in and constitute a part of this specification, illustrate one or more embodiments of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents. In addition, while some of the following description is provided mainly in the context of routers or other network elements at layer 2 and/or layer 3 and/or layer 4 of the Open Systems Interconnection (OSI) Model, the description provided herein may be applied to different types of network devices at different layers of communication (e.g., Multi-protocol label switching (MPLS) routers, Synchronous Optical Network (SONET) add-drop multiplexers, Gigabit Passive Optical network (GPONs) switches, Synchronous Digital Hierarchy (SDH) network elements, etc.).

As described herein, a packet forwarding engine (PFE) may identify or classify a data unit, such as a packet. One aspect of the classification of the data unit includes determining whether a particular rate class or rate limit has been assigned to the identified class to which the data unit belongs. If the data unit is associated with a rate limit, a flow table entry associated with the data unit may be updated or created to reflect the assigned rate limit. Although the following description refers primarily to "packets", it should be understood that scheduling and queuing of network traffic may be performed based on any suitable data unit. The term "data unit," as used herein, may refer to a packet, datagram, or cell; a fragment of a packet, datagram or call, or other types of data. Subsequent processing following packet selection, such as encapsulation, fragmentation, etc., may result in the addition of or removal of bytes from an actually transmitted packet.

The following detailed description of the invention refers to the accompanying drawings. The same reference numbers in different drawings may identify the same or similar elements.

Figure 1:
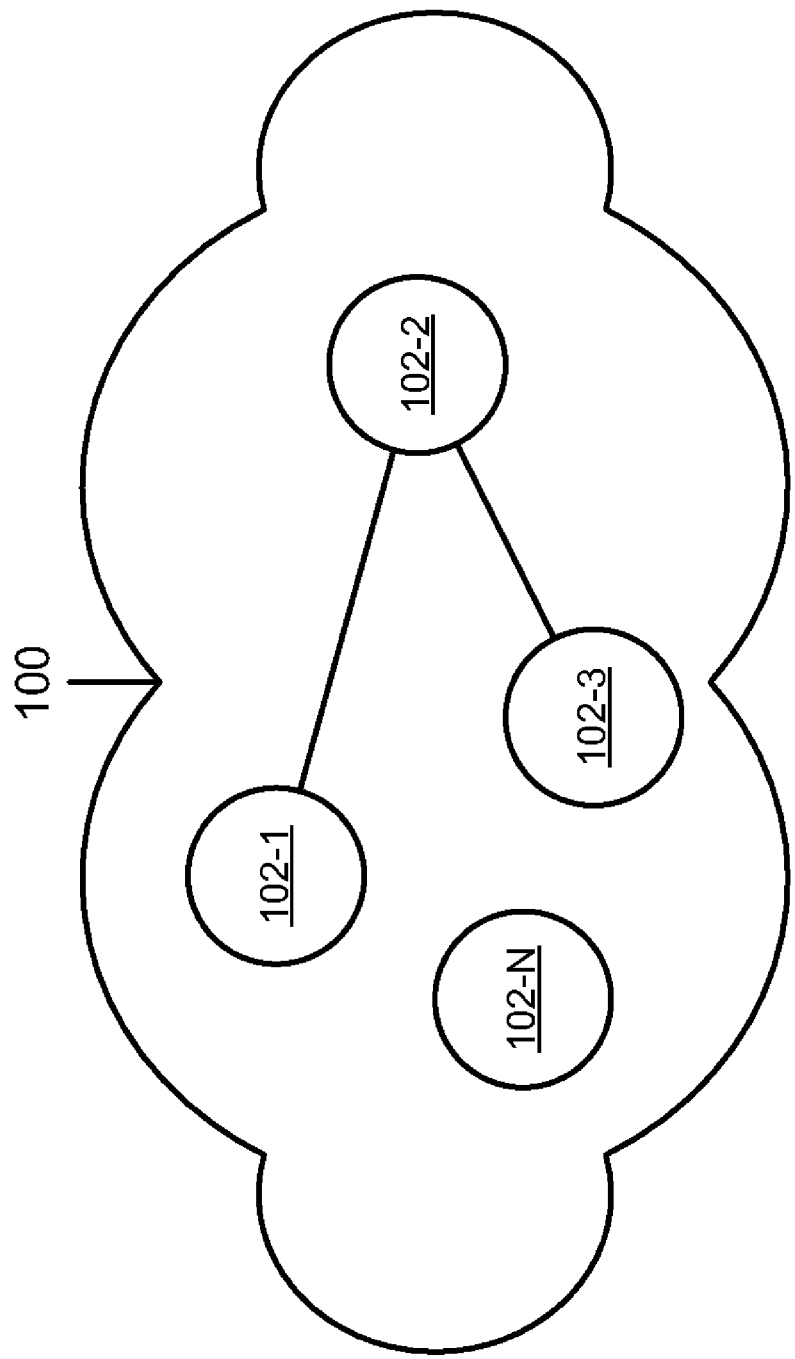
FIG. 1 is a diagram of an exemplary network 100 in which the concepts described herein may be implemented.

FIG. 1 is a diagram of an exemplary network 100 in which the concepts described herein may be implemented. Network 100 may include the Internet, an ad hoc network, a local area network (LAN), a wide area network (WAN), a metropolitan area network (MAN), a cellular network, a public switched telephone network (PSTN), any other network, or a combination of networks.

As shown, network 100 may include N network elements 102-1 through 102-N (collectively referred to herein as "network elements 102" or individually as "network element 102"). Each of network elements 102-1 through 102-N may include a switch, a router, a server, and/or another type of device. While network elements 102-1 through 102-N can be implemented as different types of devices, in the following paragraphs, network elements 102-1 through 102-N will be described in terms of a router. The links interconnecting network elements 102-1 through 102-N are shown by way of example. Network elements 102-1 through 102-N may be interconnected via various different links than those shown in FIG. 1.

Figure 2:
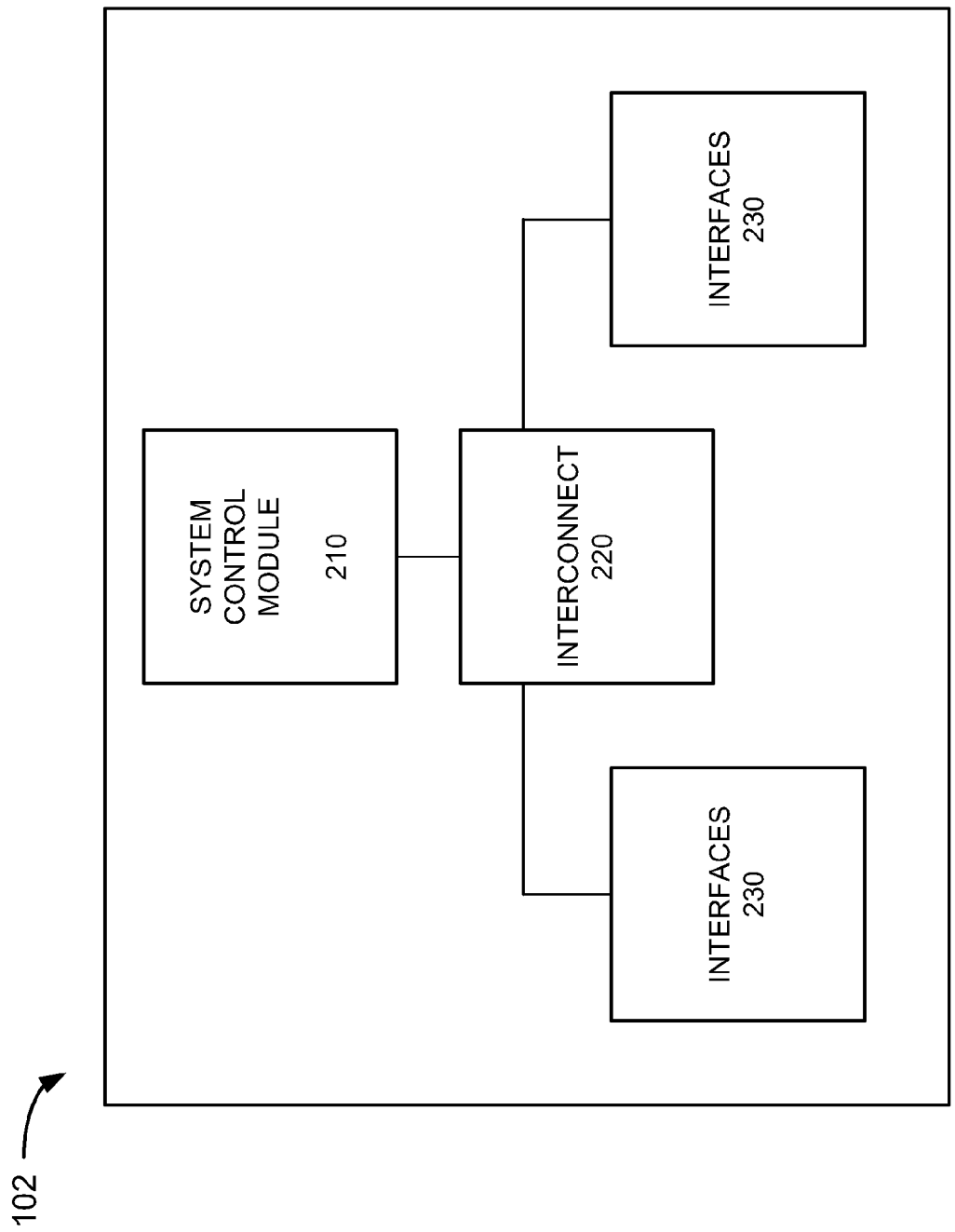
FIG. 2 is an exemplary block diagram illustrating a network element as shown in FIG. 1.

FIG. 2 shows an exemplary block diagram of network element 102. As shown, network element 102 may include a system control module 210, interconnect 220, and interfaces 230. In other implementations, network element 102 may include fewer, additional, or different components than those illustrated in FIG. 2.

System control module 210 may include one or more processors, microprocessors, application specific integrated circuits (ASICs), field programming gate arrays (FPGAs), and/or processing logic that may be optimized for networking and communications. System control module 210 may perform high level management functions for network element 102. For example, system control module 210 may communicate with other networks and systems connected to network element 102 to exchange information regarding network topology. In some implementations, system control module 210 include a routing engine for creating routing tables based on network topology information, creating forwarding tables based on the routing tables, and sending these tables to interfaces 230 for data packet routing. System control module 210 may also include a static memory (e.g. a read only memory (ROM)), a dynamic memory (e.g. a random access memory (RAM)), and/or onboard cache, for storing data and machine-readable instructions. System control module 210 may also include storage devices, such as a floppy disk, a CD or DVD ROM, a CD or DVD read/write (R/W) disc, and/or flash memory, as well as other types of storage devices.

Interconnect 220 may include one or more switches or switch fabrics for directing incoming network traffic, such as data packets, from one or more of interfaces 230 to others of interfaces 230. Interconnect 220 may also include processors, memories, and/or paths that permit communication among system control module 210 and interfaces 230.

Interfaces 230 may include devices or assemblies, such as line cards, for receiving incoming data packets or other types of data units from network links and for transmitting the data packets to network links. In other examples, interfaces 230 may include Ethernet cards, optical carrier (OC) interfaces, and asynchronous transfer mode (ATM) interfaces.

Depending on a particular implementation, the components that are shown in FIG. 2 may provide fewer or additional functionalities. For example, if network element 102 performs an Internet Protocol (IP) packet routing function as part of a Multi-Protocol Label Switching (MPLS) router, system control module 210 may perform tasks associated with obtaining routing information from other routers in a MPLS network. In such cases, conveying network traffic from one interface to another may involve label based routing, rather than IP address based routing.

Figure 3:
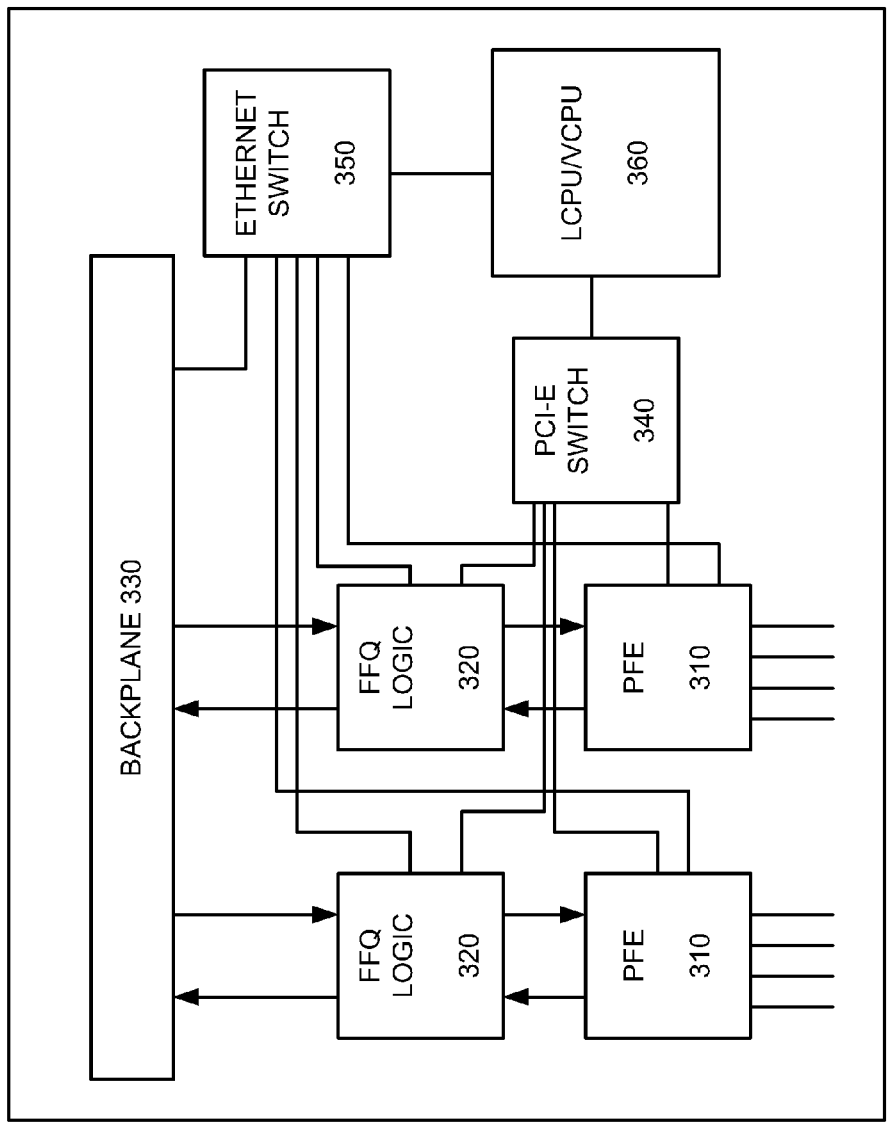
FIG. 3 is a functional diagram conceptually illustrating an interface as shown in FIG. 2.

FIG. 3 is a block diagram of an interface 230 as shown in FIG. 2. As shown, interface 230 may include packet forwarding engines (PFEs) 310-1 and 310-2 (collectively "PFEs 310" or individually, "PFE 310"), flow management and fabric queuing (FFQ) logic 320-1 and 320-2 (collectively and individually "FFQ logic 320"), backplane 330, Peripheral Component Interconnect Express (PCI-E) switch 340, Ethernet switch 350 and Local Central Processing Unit/Visibility Central Processing Unit (LCPU/VCPU) 360. In different implementations, interface 230 may include fewer, additional, or different components than those illustrated in FIG. 3.

PFEs 310 may include hardware and/or software for receiving, storing, processing and/or forwarding data packets. For example, PFEs 310 may process packets received from an incoming link and prepare packets for transmission on an outgoing link. Incoming and outgoing links are represented as vertical lines connecting to PFEs 310 in FIG. 3. PFEs 310 may also perform route lookup based on packet header information to determine destination information for the packets. PFE 310 may also include memories for storing received packets. PFE 310 may also transmit received data packets to FFQ logic 320 and may transmit/receive information and/or packets to/from PCI-E switch 340 and Ethernet switch 350.

PFEs 310 may also include one or more access control lists (ACL) for enabling classification of received packets. In one implementation, the PFEs 310 may use the ACL data structure to assign a rate limit tag to received packets during the classification process by examining a list of rules included in the ACL. For example, packets may be classified based on Layer 2 (L2), Layer 3 (L3), Layer 4 (L4) or Layer 7 (L7) information included in the packet. In one implementation, classification of packets may be based on an L3 protocol associated therewith, such as http (hypertext transfer protocol), rtp (real time protocol), ftp (file transfer protocol), etc. In another implementation, the classification of the packets may be based on the L3 source or destination field to identify a specific end user associated with a particular user class. In operation, packets may be classified based on a variety of elements, such as fields in a headers associated with each packer (e.g., L2, L3, and L4 fields). Upon classification, a rate limit associated with the identified class may be applied to the packets.

By performing an ACL lookup based on the packet's classification, a rate limit to be associated with the received packet may be obtained. The identified rate limit may be appended to the packet as a tag or field when transmitting the packet to FFQ logic 320. In one implementation, the rate limit tag may be included in a packet descriptor included with each transmitted packet. The packet descriptor may include a data structure having a number fields used for forwarding the packet across the fabric to a final destination, such as the destination line card and destination port, class of service, and several other fields that are used by the egress PFE to complete the processing of the packet.

Consistent with embodiments described herein, the rate limit tag may be included as one or more settable bits in a flow command field in the packet descriptor. In one implementation, the flow command field may include a command field and one or more operand fields that constitute the data associated with a particular command. One or more bits of the command field may be used to indicate that flow based rate limiting is to be performed for a particular flow. In this case, one of the operand fields may contain the rate limit tag to be applied upon recognition of the flow-based rate limiting bit (or bits) in the command field of the packet descriptor. The rate limit tag may identify the particular rate limit to be applied to flows of the identified class.

FFQ logic 320 may include hardware and/or software for receiving data packets from PFE 310 and monitoring and/or enforcing rate limits on the flow of data packets. For example, FFQ 320 may receive a data packet, create a table entry (i.e. flow ID) for the flow in a flow table and monitor flow statistics relating to a transmission rate for packets in each flow. Exemplary details of the flow table are described in additional detail below in FIGS. 4 and 5. For example, FFQ 320 may use a timer, and set of counters for each flow to track packet/byte counts for a flow of data packets. FFQ logic 320 may enforce the rate limit identified in the rate limit tag by comparing the assigned rate limit to values for the timer, packet and byte counters. In some implementations, FFQ 320 may also sample packets and may send sampled packets and other information, such as flow table records, to PCI-E switch 340 and/or Ethernet switch 350. FFQ 320 may also transmit data packets from PFE 310 to backplane 330.

Backplane 330 may include a switching fabric and/or memories for transmitting data packets to/from interconnect 220 (as shown in FIG. 2). PCI-E switch 340 may include a high speed switching interface for transmitting/receiving data packets and information between PFEs 310, FFQ 320 and/or LCPU/VCPU 360.

Ethernet switch 350 may include an Ethernet switch that may transmit data packets and/or information among PFE 310, FFQ 320 and/or LCPU/VCPU 360. Ethernet switch 350 may also transmit and/or receive data packets and/or information over an out-of-band plane, via backplane 330 to another device (internal or external to network element 102) for further processing and/or analysis.

Local Central Processing Unit/Visibility Central Processing Unit (LCPU/VCPU) 360 may include one or more processors, microprocessors, application specific integrated circuits (ASICs), field programming gate arrays (FPGAs), and/or processing logic for performing network communications, management and analysis functions. For example, LCPU/VCPU 360 may control functions related to (local) operations between components shown in FIG. 3 and may control functions related to "visibility" of data packets transmitted though interface 230 (as shown in FIG. 3). For example, LCPU/VCPU 360 may include hardware and/or software for managing a flow table of records and sampling data packets. For example, LCPU/VCPU 360 may receive a flow table record and sampled packets from FFQ 320. LCPU/VCPU 360 may also transmit flow table records and sampled data packets to an external device via Ethernet switch 350.

For example, in managing flow records, LCPU/VCPU 360 may receive flow table records and statistics from FFQ 320, aggregate and/or maintain the received flow table records and statistics, and export the aggregated flow table records and/or statistics to another device within network element 102, or alternatively, to a network device that is external to network element 102. LCPU/VCPU 360 may aggregate flow table records and/or statistics based on various parameters, such as a communication protocol, a port number, source and/or destination addresses, a source/destination address prefix, a source/destination autonomous system (AS) prefix, etc.

In operation, LCPU/VCPU 360 may receive the state of rate limit counters from FFQ 320. LCPU/VCPU 360 may use this information to detect specific users or user classes that are exceeding their bandwidth allocations. LCPU/VCPU 360 may also use this information to detect specific applications that are facing bandwidth bottlenecks in the network. LCPU/VCPU 360 may aggregate flow rate limit records and/or statistics based on various parameters, such as a communication protocol, a port number, source and/or destination addresses, a source/destination address prefix, a source/destination autonomous system (AS) prefix, etc.

As described herein, flexible allocation of bandwidth in a router or switch may be provided based on a flow to which a packet or other data unit is associated with. An administrator of the router or switch, by setting a relatively few number of parameters in a single access control list (ACL), can exercise fine control of rates associated with a very large number of packet flows.

Figure 4:
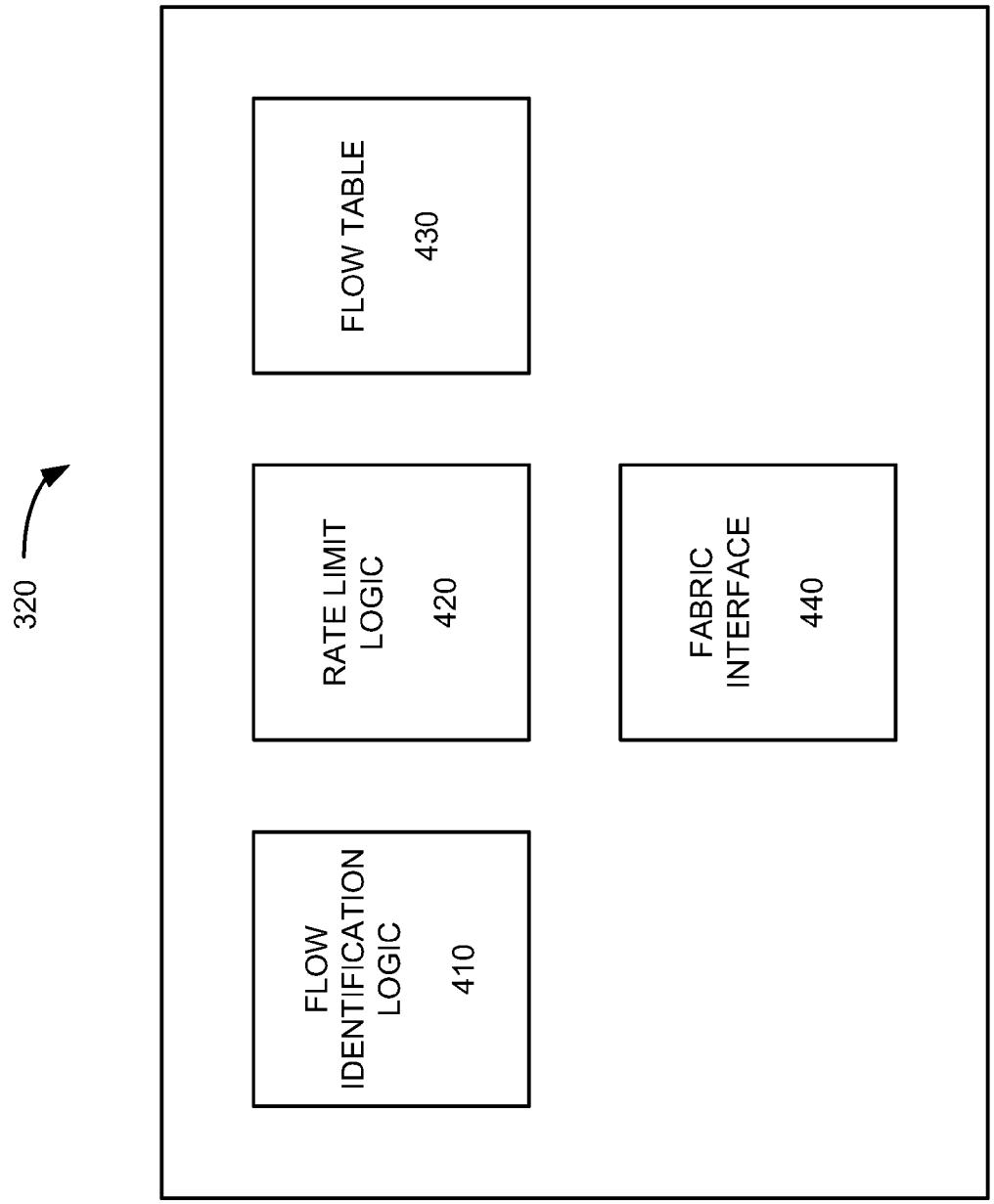
FIG. 4 is a functional block diagram of exemplary flow management and fabric queuing logic of FIG. 3.

FIG. 4 illustrates a functional block diagram of an exemplary FFQ 320 of FIG. 3. As shown, FFQ 320 may include flow identification logic 410, rate limit logic 420, a flow table 430, and a fabric interface 440. In different implementations, FFQ 320 may include fewer, additional, or different components than those illustrated in FIG. 4.

Figure 5:
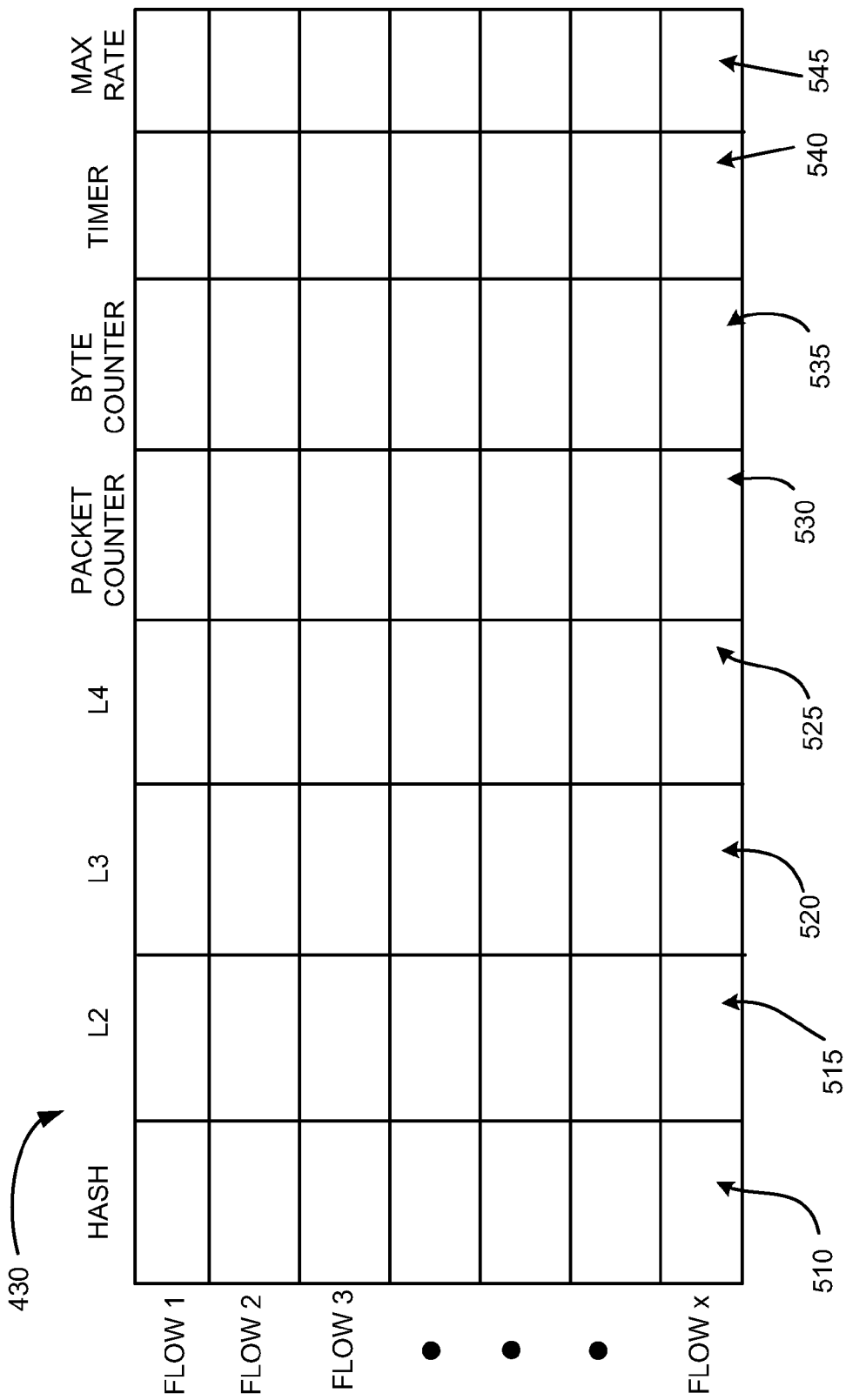
FIG. 5 is a diagram of an exemplary flow table of FIG. 4.

Flow identification logic 410 may include hardware and/or software for receiving a data packet and a packet descriptor, extracting or identifying flow identification information from the data packet, creating and/or updating information regarding the flow in flow table 430, and enforcing the rate limit identified and assigned by PFE 310. For example, flow identification logic may identify flow identification information from a five-tuple of information in the packet header. For example, the flow identification information may include numerical values in the packet header that relate to the source address, the destination address, the source port, the destination port, and/or the protocol (as shown in FIG. 5). In one implementation, the flow identification information may be calculated as a hash value of the five-tuple of information in the packet header and may be used to identify entries in flow table 430.

Flow identification logic 410 may, upon identification of the flow identification information associated with a packet, determine if an entry corresponding to the flow identification information has been previously created in flow table 430. If not, a corresponding entry may be made in flow table 430. If, however, a corresponding entry had been previously created in flow table 430 (i.e., at least one prior packet belonging to the flow had been previously received by network device 102), flow identification logic 410 may update one or more fields in the corresponding entry to reflect the newly received packet.

For example, flow identification logic 410 may update the time field and packet/byte counter fields in the flow entry in flow table 430. In some implementations, flow identification logic 410 may include one or more interfacing buffers or queues (not shown) for temporarily storing received data packets.

Rate limit logic 420 may include hardware and/or software for enforcing a rate limit assigned to an identified flow. For example, rate limit logic 420 may calculate a current rate associated with an identified flow by examining the values of the timer, byte counter, and packet counter fields updated upon receipt of the newest packet by flow identification logic 420. The calculated current rate may be compared to a maximum rate identified in the packet descriptor. In one implementation, packets resulting in a higher rate than the maximum allowed rate for the flow may be discarded or marked for discard by rate limit logic 420. Alternatively, the packet may be tagged as "over-limit" and forwarded to backplane 330 or other elements of interface 230 for additional processing.

Flow table 430 may include a number of entries corresponding to packet flows identified by network device 102. For example, each entry in flow table 430 may include a flow identification field (such as a hash value of a packet's five-tuple) used to identify each flow, other associated fields of information corresponding to packet handling (e.g., port or interface information, protocol information, etc.), as well as rate limit information fields to enable identification and enforcement of applied rate limits. In one implementation, flow table 430 may include up to four million flow entries/records, for example. An exemplary flow table 430 is shown and described below with reference to FIG. 5.

Fabric interface 440 may include hardware and/or software for providing an interface between PFE 310 and backplane 330. Fabric interface 440 may include one or more interfacing buffers or queues (not shown) for temporarily storing incoming data packets and interfacing with backplane 330.

FIG. 5 is a diagram of an exemplary flow table 430. As shown, flow table 430 may include a number of flow table entries for each of flows 1 through x. Exemplary flow table entries may include a flow identification field 510, a layer 2 (L2) information field 515, a layer 3 (L3) information field 520, a layer 4 (L4) information field 525, a packet counter field 530, a byte counter field 535, a timer field 540, and a max rate field 545.

Flow identification field 510 may include a unique or substantially unique identifier associated with a particular packet flow. For example, flow identification field 510 may include a hash value of the five-tuple (described above) corresponding to each flow. Such a value may provide an efficient way to identify and locate flows in flow table 430. L2 information field 515 may include elements of L2 information, such as a source media access control (MAC) address associated with the packet, a destination MAC address associated with the packet, etc. L3 information field 520 may include elements of L3 information, such as source and destination IP (Internet Protocol) addresses, an L3 protocol, such as http, ftp, etc. L4 information field 525 may include one or more elements of L4 information, such as source and destination port information (which often designates an application type associated with a packet), L4 protocol information, etc.

Packet counter field 530 may include information for accumulating and/or indicating a total number of packets corresponding to each flow that have been passed through the interface during a predetermined period. Byte counter field 535 may include information for accumulating and/or indicating a total number of bytes that have been transferred in the flow during the predetermined period. Timer field 540 may include timing information or a timestamp relating to packets received in the flow. Max rate field 545 may include information relating to the rate limit identified by PFE 310 and included in the packet descriptor forwarded to FFQ logic 320 along with a packet in the flow. In one implementation, successive packets in a flow may include updated or modified rate limit information as identified by the ACL in PFE 310. In this manner, rate limit adjustments for packet flows may be initiated by modifying a single ACL.

The size of flow table 430 may include the total number of flows that may be handled by network element 102. This size of flow table 430 may be as large as several million flows, since some entries of less active flows can be stored either in flash memory or in hard disk when no active packets are present in network element 102.

In one embodiment, Layer 2 field 515 may include a source and destination MAC addresses, Layer 3 field 520 may include source and destination IP addresses and a L3 protocol type, and Layer 4 field 525 may include source and destination ports and a L4 protocol type. The value of timer field 540, packet counter field 530, and byte counter field 535 may be periodically reset or moved forward in to provide a moving average of a traffic rate associated with each particular flow. For example, a max rate may be provided in packets/second or megabits/second. By resetting the timer and counter values every minute or 30 seconds, an accurate accounting may be performed.

Figure 6:
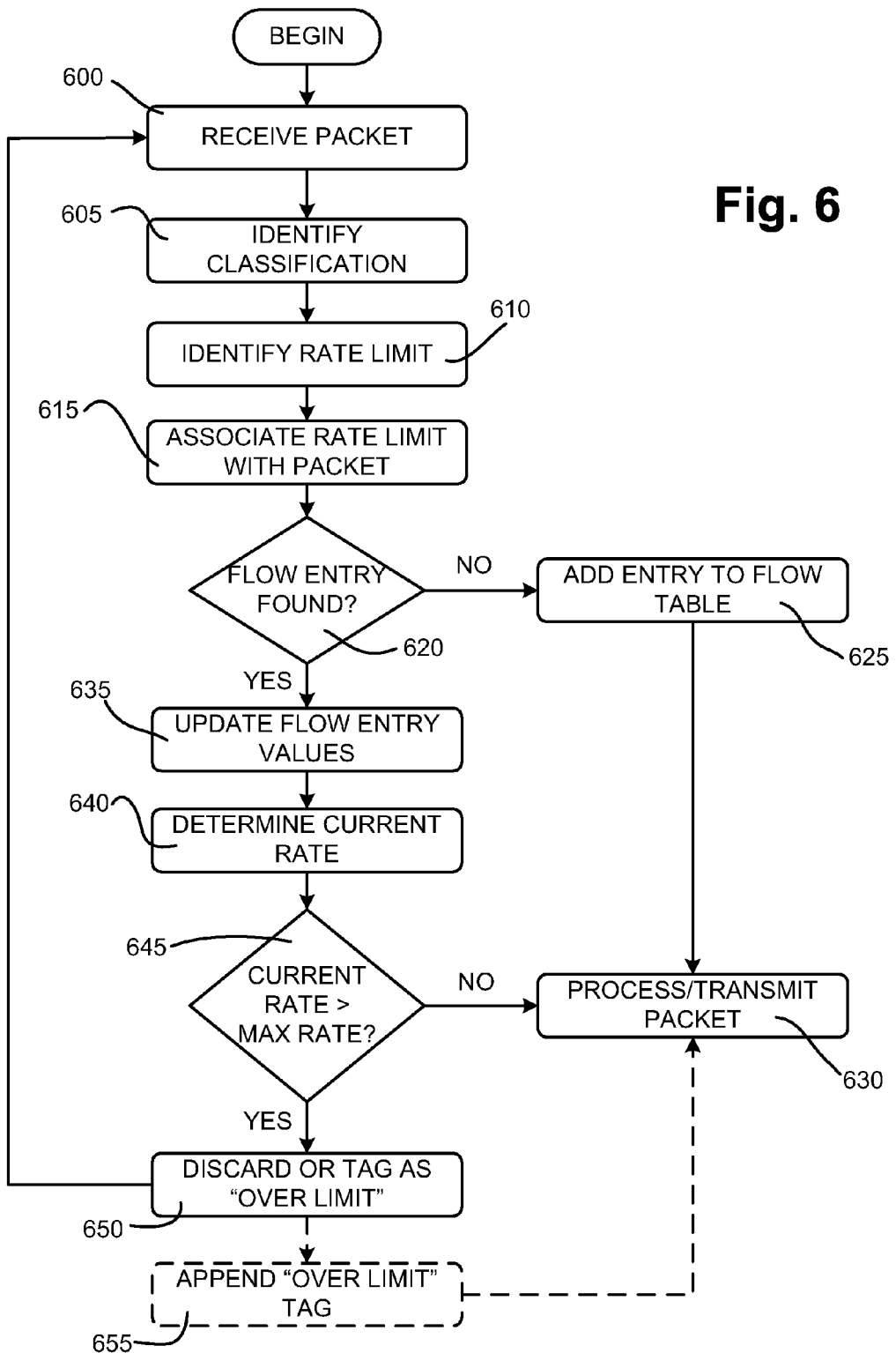
FIG. 6 is a flow diagram illustrating an exemplary process for performing flow-based rate limiting.

FIG. 6 is a flow diagram illustrating an exemplary process for performing flow-based rate limiting. In one implementation, the exemplary process may be performed at each interface by a combination of PFE 310 and FFQ logic 320. The exemplary process may begin upon receipt of a packet by PFE 310 (block 600). A classification associated with the received packet may be identified (block 610). For example, an ACL entry corresponding to the received packet may be identified by PFE 310 based on, for example, L2, L3, or L4 information associated with the packet. As described above, this determination may include parsing the packet's header information.

A rate limit associated with the identified classification may be identified (block 615). As described above, the ACL associated with PFE 310 may identify a rate limit associated with a particular classification. For example, the ACL may include a rule indicating that http traffic having a destination port of 6547 may be rate limited to 1 megabit per second. PFE 310 may parse the received packet and may determine that the packet's L3 header designates an http protocol and the packet's L4 header designates a destination port of 6547. Accordingly, a rate limit of 1 megabit per second may be identified in the ACL.

The identified rate limit may be associated with the received packet (block 615). As described above, a packet descriptor be associated with the received packet and may include a data structure having a number fields used for forwarding the packet across the fabric to a final destination. In one implementation, a rate limit identifier may be included as one or more settable bits in a flow command field in the packet descriptor.

Flow table 430 may be searched for a flow corresponding to the received packet (block 620). In one implementation, FFQ logic 320 may receive the packet and rate limit tag from PFE 310 and may identify a flow identifier from the packet. FFQ logic 320 may then search flow table 430 for the received packet's flow identifier. For example, flow identification logic 410 may use a five-tuple received in the packet header to form the flow identifier. As described above, the flow identifier may be calculated as a hash value of the five-tuple of information received in the packet header. FFQ 320 may then check flow table 430 for a match of an existing flow identifier. If an existing flow is not identified in flow table 430 (block 620: NO), a new entry may be added to flow table 430 (block 625). For example, values corresponding to those in the received packet and its associated packet descriptor or rate limit tag may be inserted as a new entry in flow table 430. The packet may then be forwarded for additional processing and/or transmission (block 630) and processing may return to block 600 for receipt of a next packet.

If, however, a match of the flow identifier of the received packet is found in flow table 430, an existing flow match may be determined (block 620: YES). If an existing flow match has been determined, flow entry values corresponding to the flow may be updated (block 635). For example, flow identification logic 410 may count the number of packets/bytes in the flow and may update the packet counter field 530 and/or byte counter field 535, respectively (as shown in FIG. 5). Additionally, timer field 540 may be updated to reflect a timestamp associated with the received packet. Further, max rate field 545 may be updated to reflect a value of the rate limit tag associated with the received packet and identified in PFE 310 (which may be different than a previous value of max rate field 545).

A current rate of traffic in the identified flow may be determined based on the values of packet counter field 530, byte counter field 535, and timer field 540 (block 640). For example, a total number of bytes indicated in byte counter field 535 that have been received during a time indicated by the value of timer field 540 may be converted to megabits/second. Similarly, a total number of packets 530 indicated in packet counter field 530 that have been received during a time indicated by the value of timer field 540 may be converted to packets/second.

It may be determined whether a current rate of traffic for the identified flow exceeds a max traffic rate identified in max rate field 545 (block 645). For example, it may be determined whether the current traffic rate in megabits/second exceeds the maximum flow traffic rate in megabits/second. If it is determined that the max rate has not been exceeded, processing may continue to block 630 where the packet may be forwarded for additional processing and/or transmission.

If, however, the current rate of traffic for the flow exceeds the max traffic rate identified in max rate field 545, the packet may be discarded or tagged as "over limit" (block 650). In the case of discard (depicted by a solid line extending from block 650), processing may return to block 600 for receipt of a next packet. In the case of "over limit" tagging (depicted by a dashed line extending from block 650), an "over limit tag" may be appended to the packet (block 655) and the packet may continue to block 630 where the packet may be forwarded for additional processing and/or transmission. For example, the packet may be held in a buffer for transmission a later time.

Consistent with embodiments described herein, rate limits for received packets may be applied on a per-flow basis using flow table mechanics and entries. In this manner, rate limiting of traffic flows may be performed in an easily scalable manner, efficiently, and with reduced expense.

CONCLUSION

The foregoing description of exemplary embodiments of the invention provides illustration and description, but is not intended to be exhaustive or to limit the invention to the precise form disclosed. Modifications and variations are possible in light of the above teachings or may be acquired from practice of the invention.

For example, while a series of blocks have been described with regard to FIG. 6, the order of the blocks may be modified in other implementations. Further, non-dependent blocks may represent blocks that can be performed in parallel. For example, blocks 600-655 that are performed for one data packet may be independent of blocks 600-655 for a second data packet and, therefore, may be performed in parallel to blocks 600-655 for the second data packet. Further, it may be possible to omit blocks within a process.

It will be apparent that aspects described herein may be implemented in many different forms of software, firmware, and hardware in the implementations illustrated in the figures. The actual software code or specialized control hardware used to implement aspects does not limit the embodiments. Thus, the operation and behavior of the aspects were described without reference to the specific software code—it being understood that software and control hardware can be designed to implement the aspects based on the description herein.

Further, certain portions of the implementations have been described as "logic" that performs one or more functions. The term "logic", whether unmodified or modified (e.g., flow logic, processing logic, flow management and fabric queuing logic, etc.) may include hardware, such as a processor, an application specific integrated circuit, or a field programmable gate array, software, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, block, or instruction used in the present application should be construed as critical or essential to the implementations described herein unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
   receiving, using one or more processors, a packet;
   identifying, using one or more processors, a rate limit, associated with a flow that is associated with the received packet, based on:
      layer 2 information included in the received packet,
      layer 3 information included in the received packet, and
      layer 4 information included in the received packet;
   identifying, using one or more processors and based on the received packet, an entry in a flow table,
   the entry corresponding to the flow and including information identifying:
      a quantity of packets, associated with the flow, received during a time period,
      a quantity of bytes, associated with the flow, received during the time period, and
      the time period;
   calculating, using one or more processors, a current rate associated with the identified flow based on the time period and at least one of:
      the quantity of packets, or
      the quantity of bytes;
   determining, using one or more processors, whether the calculated current rate, associated with the flow, exceeds the identified rate limit associated with the flow; and
   discarding, using one or more processors, the received packet when the calculated current rate, associated with the identified flow, exceeds the identified rate limit associated with the identified flow.

2. The method of claim 1, further comprising:
   extracting packet information from the received packet,
      the extracted packet information including the layer 2 information, the layer 3 information, and the layer 4 information;
   generating a flow identifier based on the extracted packet information; and
   identifying the entry based on the generated flow identifier in the flow table.

3. The method of claim 2, where generating the flow identifier comprises generating a hash value based on the extracted packet information.

4. The method of claim 3, where the extracted packet information comprises a five-tuple of information included in a header associated with the packet.

5. The method of claim 4, where the five-tuple of information comprises a source address, a destination address, information identifying a source port, information identifying a destination port, and information identifying a protocol associated with the packet,
   where generating the hash value comprises generating the hash valued based on the source address, the destination address, the information identifying the source port, the information identifying the destination port, and the information identifying the protocol included the five-tuple of information, and
   where the flow is identified based on the hash value.

6. The method of claim 1, where the entry includes information corresponding to the rate limit.

7. The method of claim 1, further comprising:
- determining that an entry, corresponding to a flow associated with a second packet, is not found in the flow table; and
- creating the entry, corresponding to the flow associated with the second packet, in the flow table based on:
  - determining that the entry, corresponding to the flow associated with the second packet, is not found in the flow table, and
  - the second packet,
- the created entry including a field indicating a rate limit that is based on packet information included in the second packet.

8. The method of claim 1, further comprising:
- identifying a class associated with the received packet based on at least one of: the layer 2 information, the layer 3 information, and the layer 4 information,
- where identifying the rate limit comprises identifying the rate limit based on the identified class associated with the received packet.

9. The method of claim 8, further comprising identifying the class associated with the packet using an access control list.

10. The method of claim 1, further comprising:
- appending an over limit tag to the packet when the calculated current rate associated with the identified flow exceeds the identified rate limit associated with the flow,
- the over limit tag indicating that the calculated current rate, associated with the identified flow, exceeds the identified rate limit.

11. The method of claim 1, further comprising:
- forwarding the packet for transmission when the calculated current rate, associated with the identified flow, does not exceed the identified rate limit associated with the flow.

12. A network device, comprising:
- a processor to:
  - receive a data unit;
  - identify a class associated with the received data unit, the class being identified based on:
    - layer 2 information included in the received data unit,
    - layer 3 information included in the received data unit, and
    - layer 4 information included in the received data unit;
  - identify a rate limit associated with the received data unit based on the identified class;
  - identify, based on the received data unit, information identifying a flow, associated with the received data unit, in a memory;
  - the information identifying the flow including:
    - a quantity of packets, associated with the flow, received during a time period,
    - a quantity of bytes, associated with the flow, received during the time period, and
    - information identifying the time period;
  - calculate a current rate associated with the flow based on the information identifying the time period and at least one of:
    - the quantity of packets, or
    - the quantity of bytes;
  - determine whether the calculated current rate exceeds the identified rate limit; and
  - discard the received data unit when the calculated current rate exceeds the identified rate limit.

13. The network device of claim 12, where, when identifying the class associated with the received data unit, the processor is to perform a lookup in a list associated with the processor.

14. The network device of claim 13, where the processor is to perform the lookup based on at least one of the layer 2 information, the layer 3 information, or the layer 4 information.

15. The network device of claim 12, where the processor is further to:
- receive another data unit, associated with the flow, prior to receiving the data unit;
- determine whether the information identifying the flow is stored in the memory after receiving the other data unit; and
- store the information identifying the flow in the memory when the information identifying the flow is not stored in the memory, the stored information, identifying the flow, being based on information included in the other data unit.

16. A system comprising:
- a network device to:
  - receive a packet;
  - identify a rate limit associated with a flow corresponding to the packet,
  - the rate limit being identified based on:
    - layer 2 information included in the packet,
    - layer 3 information included in the packet, and
    - layer 4 information included in the packet;
  - identify information identifying the flow corresponding to the packet, the information identifying the flow including information identifying:
    - a quantity of packets, associated with the flow, received during a time period,
    - a quantity of bytes, associated with the flow, received during the time period, and
    - the time period;
  - calculate a current rate associated with the flow based on the time period and at least one of:
    - the quantity of packets, or
    - the quantity of bytes;
  - determine whether the calculated current rate exceeds the rate limit; and
  - forward the packet for transmission when the calculated current rate does not exceed the identified rate limit.

17. The system of claim 16, where, when identifying the rate limit, the network device is to:
- identify the rate limit based on:
  - information identifying a protocol, associated with the packet, included in the layer 3 information, and
  - information identifying a destination port, associated with the packet, included in the layer 4 information.

18. The system of claim 16, where the network device is further to:
- identify a class associated with the packet based on the layer 2 information, the layer 3 information, and the layer 4 information,
- the rate limit being identified based on the class.

19. The system of claim 16, where the network device is further to:
- discard the packet when the calculated current rate exceeds the identified rate limit.

* * * * *

UNITED STATES PATENT AND TRADEMARK OFFICE
CERTIFICATE OF CORRECTION

PATENT NO. : 8,284,665 B1  
APPLICATION NO. : 12/020927  
DATED : October 9, 2012  
INVENTOR(S) : Gunes Aybay Page 1 of 1

It is certified that error appears in the above-identified patent and that said Letters Patent is hereby corrected as shown below:

Column 11, line 16 (claim 8, line 3), delete "at least one of:".

Signed and Sealed this
Twenty-fifth Day of December, 2012

David J. Kappos
*Director of the United States Patent and Trademark Office*